(12) United States Patent
Murdock (10) Patent No.: US 10,280,759 B2
(45) Date of Patent: May 7, 2019

(54) MECHANICALLY RETAINED FAN BLADE COVER

(71) Applicant: UNITED TECHNOLOGIES CORPORATION, Farmington, CT (US)

(72) Inventor: James R. Murdock, Tolland, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 435 days.

(21) Appl. No.: 15/163,933

(22) Filed: May 25, 2016

(65) Prior Publication Data

US 2017/0343007 A1    Nov. 30, 2017

(51) Int. Cl.
*F01D 5/14* (2006.01)
*F01D 5/16* (2006.01)

(52) U.S. Cl.
CPC ............... *F01D 5/147* (2013.01); *F01D 5/16* (2013.01); *F05D 2220/36* (2013.01); *F05D 2260/36* (2013.01); *Y02T 50/672* (2013.01); *Y02T 50/673* (2013.01)

(58) Field of Classification Search
CPC .... F04D 29/325; F04D 29/388; F04D 29/324; F01D 5/147; F05D 2260/36; F05D 2220/36
See application file for complete search history.

(56) References Cited

U.S. PATENT DOCUMENTS

| | | | |
|---|---|---|---|
| 994,166 A | 6/1911 | Kienast | |
| 2,960,305 A * | 11/1960 | Stalker | F01D 5/147 29/889.72 |
| 6,039,542 A * | 3/2000 | Schilling | F01D 5/147 29/889.72 |
| 7,980,817 B2 * | 7/2011 | Foose | F01D 5/16 416/224 |
| 9,359,901 B2 * | 6/2016 | Evans | B23P 11/025 415/208.1 |
| 2013/0064661 A1 * | 3/2013 | Evans | F01D 5/147 415/191 |
| 2014/0170435 A1 * | 6/2014 | Hui | F01D 25/005 415/208.1 |

(Continued)

FOREIGN PATENT DOCUMENTS

| | | | | |
|---|---|---|---|---|
| DE | 102013219772 | | 4/2015 | |
| DE | 102013219772 A1 * | | 4/2015 | ............. B23P 15/04 |

(Continued)

OTHER PUBLICATIONS

EP Search Report dated Nov. 8, 2017 in EP Application No. 17172938.7.

*Primary Examiner* — Igor Kershteyn
*Assistant Examiner* — Topaz L. Elliott
(74) *Attorney, Agent, or Firm* — Snell & Wilmer, L.L.P.

(57) ABSTRACT

A blade assembly may be configured to rotate about an axis of a gas turbine engine. The blade assembly may include a blade and a blade cover. A blade may include a first surface defining a perimeter of a cavity in the blade. A first portion of the perimeter of the cavity includes a lip. A blade cover disposed over the cavity in the blade, such that the cavity is disposed between the blade and the blade cover, and under the lip, such that blade cover is between a portion of the blade and the cavity.

11 Claims, 5 Drawing Sheets

(56) References Cited

U.S. PATENT DOCUMENTS

| | | | |
|---|---|---|---|
| 2016/0123167 A1* | 5/2016 | Fribourg | F01D 5/147 428/613 |
| 2016/0265363 A1* | 9/2016 | McCaffrey | F01D 25/005 |
| 2016/0305443 A1* | 10/2016 | Schwarz | F01D 5/14 |
| 2017/0023007 A1* | 1/2017 | Roche | B23K 20/122 |

FOREIGN PATENT DOCUMENTS

| | | |
|---|---|---|
| EP | 0926312 | 6/1999 |
| WO | 2015102691 | 7/2015 |

* cited by examiner

MECHANICALLY RETAINED FAN BLADE COVER

FIELD

The present disclosure relates to gas turbine engines, and, more specifically, to a fan blade and blade cover.

BACKGROUND

A gas turbine engine typically includes a fan section, a compressor section, a combustor section, and a turbine section. A fan section may drive air along a bypass flowpath while a compressor section may drive air along a core flowpath. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other gas turbine engine loads. The compressor section typically includes low pressure and high pressure compressors, and the turbine section includes low pressure and high pressure turbines.

The fan section, compressor section, and turbine section typically include a series of rotor systems. Rotor systems typically include a disk and a plurality of circumferentially spaced blades. The rotor disk and the blades are subject to high radial forces. During engine operation, a blade or a fragment thereof may separate from the remainder of the rotor system. One portion of a blade that is vulnerable to separation from the blade body is a blade cover. Partial or complete separation of a blade cover from one or more blade bodies can cause damage to a downstream component of the engine.

SUMMARY

A blade assembly for a rotor disk configured to rotate about an axis of a gas turbine engine is described herein, in accordance with various embodiments. A blade may include a first surface defining a perimeter of a cavity in the blade. A first portion of the perimeter of the cavity may include a lip. A blade cover disposed over the cavity in the blade, such that the cavity is disposed between the blade and the blade cover, and under the lip, such that blade cover is between a portion of the blade and the cavity.

In various embodiments, the first portion of the perimeter of the cavity may be disposed along at least one of a leading edge, a tip, a trailing edge or a radially inner edge of the blade. A second portion of the perimeter of the cavity may include a supporting surface. The second portion of the perimeter of the cavity may be disposed along at least one of a leading edge, a tip, a trailing edge or a radially inner edge of the blade. The blade cover may be disposed over the supporting surface such that a portion of the blade is disposed between the blade cover and the cavity. An outer surface of the blade cover may contact an inner surface of the blade, and an inner surface of the blade cover may contact an outer surface of the blade. An adhesive may be formed between the blade cover and the blade.

A fan section of a gas turbine engine is also provided. The fan section may include a blade assembly configured to rotate about an axis. The blade assembly may include a blade and a blade cover. A blade may include a first surface defining a perimeter of a cavity in the blade. A first portion of the perimeter of the cavity may include a lip. A blade cover may be disposed over the cavity in the blade and under the lip.

In various embodiments, the first portion of the perimeter of the cavity may be disposed along at least one of a leading edge, a tip, a trailing edge or a radially inner edge of the blade. A second portion of the perimeter of the cavity may include a supporting surface. The second portion of the perimeter of the cavity may be disposed along at least one of a leading edge, a tip, a trailing edge or a radially inner edge of the blade. The blade cover may be disposed over the supporting surface such that a portion of the blade is disposed between the blade cover and the cavity. The first portion of the perimeter of the cavity may be disposed along a leading edge and a tip of the blade, and the second portion of the perimeter of the cavity may be disposed along a trailing edge and a radially inner edge of the blade. The first portion of the perimeter of the cavity may be disposed along a tip and a radially inner edge of the blade, and the second portion of the perimeter of the cavity may be disposed along a trailing edge and a leading edge of the blade. The first portion of the perimeter of the cavity may be disposed along a trailing edge and a leading edge of the blade, and the second portion of the perimeter of the cavity may be disposed along a tip and a radially inner edge of the blade. An outer surface of the blade cover may contact an inner surface of the blade, and an inner surface of the blade cover may contact an outer surface of the blade. An adhesive may be formed between the blade cover and the blade.

A gas turbine engine is also provided. The gas turbine engine may include a fan section including a rotor system. The rotor system may include a disk and a blade assembly coupled to the disk. The disk may be configured to rotate about an axis of a gas turbine engine. The blade assembly may include a blade and a blade cover. A blade may include a first surface defining a perimeter of a cavity in the blade. A first portion of the perimeter of the cavity may include a lip. A blade cover may be disposed over the cavity in the blade, such that the cavity is disposed between the blade and the blade cover, and under the lip, such that blade cover is between a portion of the blade and the cavity.

In various embodiments, the first portion of the perimeter of the cavity is disposed at a radially outer edge and a leading edge of the blade. A second portion of the perimeter of the cavity may include a supporting surface and the blade cover may be disposed over the supporting surface. An outer surface of the blade cover may contact an inner surface of the blade, and an inner surface of the blade cover may contact an outer surface of the blade.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact. Cross hatching lines may be used throughout the figures to denote different parts but not necessarily to denote the same or different materials.

As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion.

As used herein, "distal" refers to the direction radially outward, or generally, away from the axis of rotation of a turbine engine. As used herein, "proximal" refers to a direction radially inward, or generally, towards the axis of rotation of a turbine engine.

Figure 1:
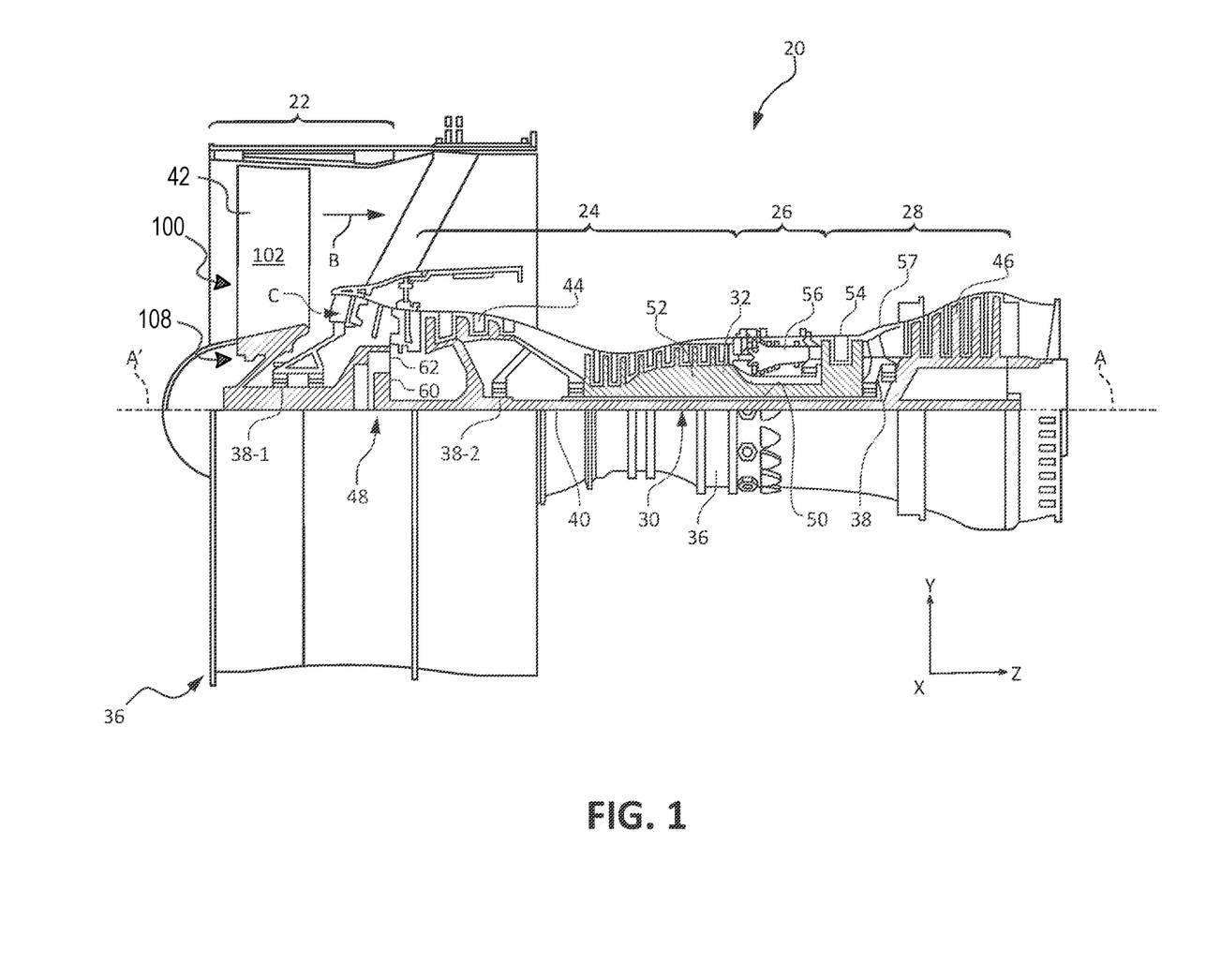
FIG. 1 illustrates a cross-sectional view of an exemplary gas turbine engine, in accordance with various embodiments.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive coolant (e.g., air) along a bypass flow-path B while compressor section 24 can drive coolant along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A'-A relative to an engine static structure 36 or engine case via several bearing systems 38, 38-1, and 38-2. Engine central longitudinal axis A'-A is oriented in the z direction on the provided xyz axis. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor 44 and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54. A combustor 56 may be located between high pressure compressor 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A'-A, which is collinear with their longitudinal axes. As used herein, a "high pressure" compressor or turbine experiences a higher pressure than a corresponding "low pressure" compressor or turbine.

The core airflow C may be compressed by low pressure compressor 44 then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion.

Gas turbine engine 20 may be, for example, a high-bypass ratio geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared aircraft engine, such as a geared turbofan, or non-geared aircraft engine, such as a turbofan, or may comprise any gas turbine engine as desired.

In a turbofan engine, lighter components generally lead to more efficient performance. If less energy is expended moving internal engine parts, more energy is available for useful work. At the same time, the components themselves must be strong enough to withstand forces typical for the operating environment and performance envelope. Combining parts having both high strength and low density greatly restricts material choices and increases costs.

The fan section 22, the compressor section 24 and the turbine section 28 may each comprise rotor systems including blade assemblies having one or more sets of rotating blades, which may rotate about engine central longitudinal axis A'-A. In blade assemblies, hollow blades advantageously reduce the weight associated with the larger blades. A need exists to cover hollow blade cavities while providing better protection from liberation of the cover. Accordingly, mechanical retention of blade covers are disclosed to strengthen the attachment of blade covers to the blade without creating undesirable stress concentrations in the blade.

Fan section 22 may comprise fan 42 including a blade assembly 100. Blade assembly 100 may comprise a plurality of rotating blades or fan blades 102 coupled to a disk or fan disk 108, which may be configured to rotate about engine central longitudinal axis A'-A. Disk 108 may be centered on the rotation axis of the gas turbine engine with a plurality of blades 102 attached to the disk 108 and spaced apart in the circumferential or tangential direction.

Figure 2:
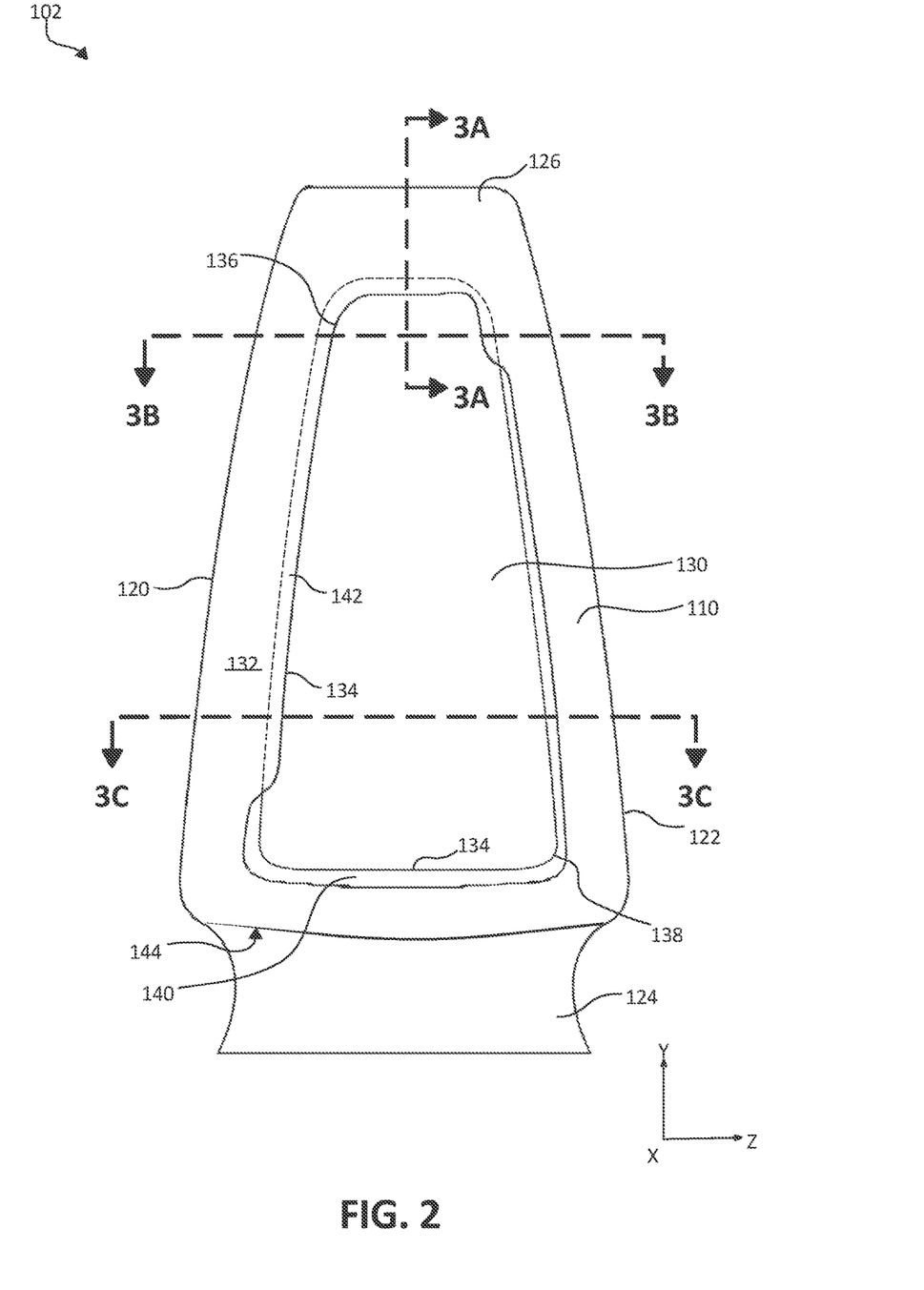
FIG. 2 illustrates a side view of a blade assembly, in accordance with various embodiments.

With reference to FIG. 2, a blade 102 for a gas turbine is shown in additional detail in accordance with various embodiments. Blade 102 may include a blade body 110 between a leading edge 120 and a trailing edge 122 of blade 102. Blade 102 may include a hub end or root 124, which may attach to a disk, and a radially outer edge or tip 126 located radially outward from the root 124. The leading edge 120 and trailing edge 122 may extend from root 124 to tip 126 of blade 102, with root 124 being located radially inward with respect to blade body 110 and tip 126 being located radially outward with respect to blade body 110. Blade 102 may further include a generally concave pressure side and a generally convex suction side joined together at the respective leading edge 120 and trailing edge 122. Blade 102 may include a blade body 110 and may be fabricated from titanium, a titanium alloy, aluminum, aluminum alloy, composite material or other suitable structural material(s). To reduce the weight of blade 102, one or more cavities 130 may be formed through blade body 110. Cavity 130 is shown in FIG. 2 as being formed in first surface 132, which may be a suction surface or a pressure surface of blade 102. Cavity 130 may further include a plurality of channels (see FIGS. 3B and 3C). Thus, blade 102 may be a hollow or partially hollow aerodynamic structure.

In various embodiments, blade body 110 may further define a perimeter 134 of cavity 130 as further defined by first surface 132. Blade 102 and cavity 130 may be configured to receive a blade cover 200 (see FIG. 4). A perimeter 134 of cavity 130 may be configured with a retention feature and a support feature. Perimeter 134 may include a first portion 136, having a retention feature, and a second portion 138, having a support feature. The retention feature of a first portion 136 may include a lip 142, which may extend inwardly from blade body 110 toward cavity 130 and terminate at the perimeter 134 of the cavity 130. Lip 142 may comprise the first portion 136 of perimeter 134. The support feature of second portion 138 of perimeter 134 may include a supporting surface 140, which may extend inwardly from blade body 110 and toward cavity 130 and terminate at the perimeter 134 of the cavity 130. Supporting surface 140 may comprise the second portion 138 of perimeter 134. First portion 136 having a retention feature, such as lip 142, and second portion 138 having a support feature, such as supporting surface 140, may comprise the entirety of perimeter 134 of cavity 130.

In various embodiments and with reference to FIGS. 2 and 3A-3C, a blade cover 200 (see FIG. 4) may be placed over cavity 130, such that cavity 130 may be disposed between blade cover 200 and blade 102, to cover cavity 130 and form a generally continuous first surface 132 of blade 102. Cavity 130 may be configured to receive blade cover 200, which may be disposed over supporting surface 140 and under lip 142, wherein "under" in this context only means between lip 142 and blade body 110 of blade 102, between lip 142 and cavity 130, and/or between first surface 132 and second surface 152 of blade 102 (see FIG. 3A). Blade cover 200 may be positioned such that blade cover 200 is disposed both over cavity 130 and under lip 142 (see FIG. 3C). Blade cover 200 may be disposed over cavity 130 in blade 102 such that cavity 130 is disposed between blade 102 and blade cover 200. Further, blade cover 200 may be disposed under the lip 142 such that blade cover 200 is between a portion of blade 102 and cavity 130.

In various embodiments, cavity 130 may follow a shape of the blade body 110 of blade 102, such that first portion 136 of perimeter 134 may follow a leading edge 120 and a tip 126 of blade 102. Tip 126 of blade 102 may comprise a radially outer edge of blade 102. The retention feature, such as lip 142, may generally be positioned along leading edge 120 and tip 126 of blade 102. Lip 142 may be positioned along any of leading edge 120, radially inner edge 144, root 124, tip 126, and/or trailing edge 122 of blade 102. For example, lip 142 may be disposed along at least a portion of leading edge 120 and tip 126 of blade 102, and may further be disposed along a portion of trailing edge 122 of blade 102. Thus, first portion 136 of perimeter 134 may comprise any of leading edge 120, radially inner edge 144, tip 126, and/or trailing edge 122. Second portion 138 of perimeter 134 of cavity 130 may follow a trailing edge 122 and radially inner edge 144 of blade 102. The support feature, such as supporting surface 140, may generally be positioned along trailing edge 122 and radially inner edge 144. Supporting surface 140 may be positioned along any of leading edge 120, radially inner edge 144, tip 126, and/or trailing edge 122 of blade 102. For example, supporting surface 140 may be disposed along at least a portion of trailing edge 122 and radially inner edge 144 of blade 102, and may further be disposed along a portion of leading edge 120 of blade 102. Thus, second portion 138 of perimeter 134 may comprise any of leading edge 120, radially inner edge 144, tip 126, and/or trailing edge 122.

In various embodiments, lip 142 may be disposed along at least a portion of tip 126 and radially inner edge 144, while supporting surface 140 may be disposed along at least a portion of leading edge 120 and trailing edge 122. Lip 142 may be disposed along at least a portion of leading edge 120 and trailing edge 122, while supporting surface 140 may be disposed along at least a portion of tip 126 and radially inner edge 144. It will be understood that lip 142 and supporting surface 140 may be formed at various locations along perimeter 134 of cavity 130.

Figure 3A:
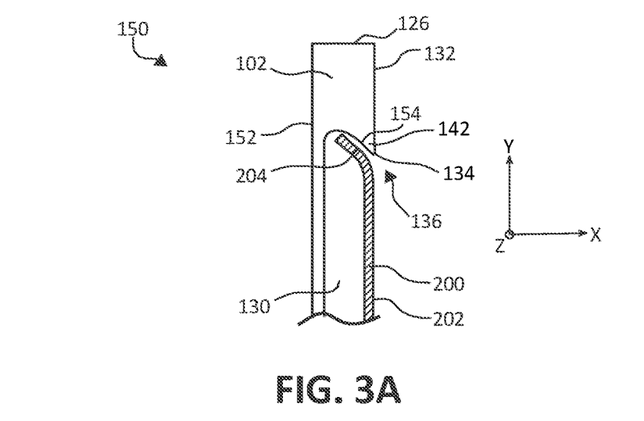
FIG. 3A illustrates a cross-sectional view taken along line 3A-3A of FIG. 2 of a blade assembly, in accordance with various embodiments.

With reference to FIG. 3A, a blade assembly 150 for a rotor system, such as for a fan section, is shown in accordance with various embodiments. FIG. 3A shows a cross sectional view of first portion 136 of perimeter 134 of cavity 130 from FIG. 2, the cross section taken along line 3A-3A in FIG. 2. FIG. 3A further shows a blade cover 200 in the cross sectional view. In various embodiments, a blade 102 and a blade cover 200 together may comprise a blade assembly 150. Blade 102 may include a second surface 152 opposite to first surface 132. While cavity 130 is shown in FIG. 3A as being formed through first surface 132, it will be understood that the cavity 130 may be formed through second surface 152 of blade 102.

In various embodiments, blade cover 200 may fit under lip 142, wherein "under" in this context only means between lip 142 and blade body 110 of blade 102, between lip 142 and cavity 130, and/or between first surface 132 and second surface 152 of blade 102. An outer surface 202 of blade cover 200 may form a generally continuous surface with first surface 132 of blade 102. Cavity 130 may be defined between blade 102 and blade cover 200. Blade cover 200 may include a radially outer edge 204 configured to fit under lip 142 of blade 102. Radially outer edge 204 of blade cover 200 may include a complementary shape or angle to an inner surface 154 of lip 142. Outer surface 202 of blade cover 200 may contact inner surface 154 of lip 142. Radially outer edge 204 of blade cover 200 may fit under lip 142 of blade for mechanical retention in a radially outward direction and a circumferential direction. Lip 142 may extends over radially outer edge 204 of blade cover 200 such that radially outer edge 204 of blade cover 200 is disposed between portions of blade 102 to retain blade cover 200, for example, with respect to the x direction. When blade 102 rotates, centrifugal forces act on blade 102 and blade cover 200, and lip 142 of blade 102 retains blade cover 200, for example, with respect to the y direction.

Figure 3B:
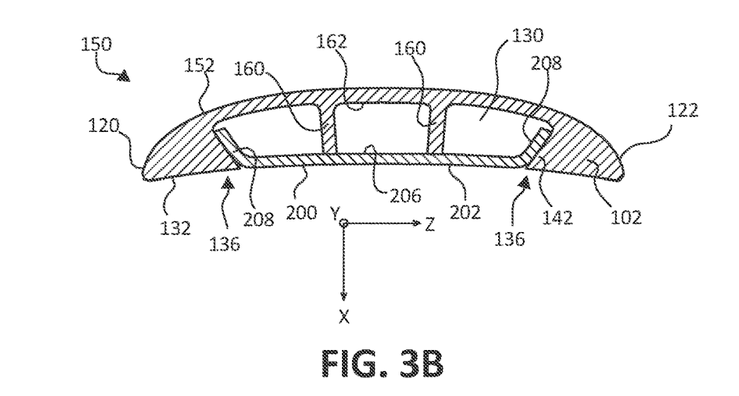
FIG. 3B illustrates a cross-sectional view taken along line 3B-3B of FIG. 2 of a blade assembly, in accordance with various embodiments.

With reference to FIG. 3B, a blade assembly 150 for a rotor system, such as for a fan section, is shown in accordance with various embodiments. FIG. 3B shows a cross sectional view of first portion 136 of perimeter 134 of cavity 130 from FIG. 2, the cross section taken along line 3B-3B of FIG. 2. FIG. 3B further shows a blade cover 200 in the cross sectional view. Blade cover 200 may be disposed over cavity 130 in blade 102, such that cavity 130 is disposed between blade 102 and blade cover 200. Blade cover 200 may engage with blade 102 over cavity 130, covering the cavity and completing a substantially continuous surface of blade assembly 150. At a distal end of blade cover 200, blade cover 200 may include an outer edge portion 208 configured to fit under lip 142 of blade 102. Outer edge portion 208 of blade cover 200 may be angled inward with respect to blade cover 200 and toward cavity 130. Lip 142 may extend inwardly toward cavity 130 and over outer edge portion 208 of blade cover 200, such that blade cover 200 is disposed between portions of blade 102 to retain blade cover 200, for example, with respect to the x and z directions. Blade cover 200 may be bonded to blade 102, forming a concave aerodynamic flow surface over cavities 130. Alternatively, blade cover 200 may be bonded to second surface 152 of blade 102 to form a convex flow surface, or multiple blade covers 200 may be used at first surface 132 and second surface 152.

Figure 3C:
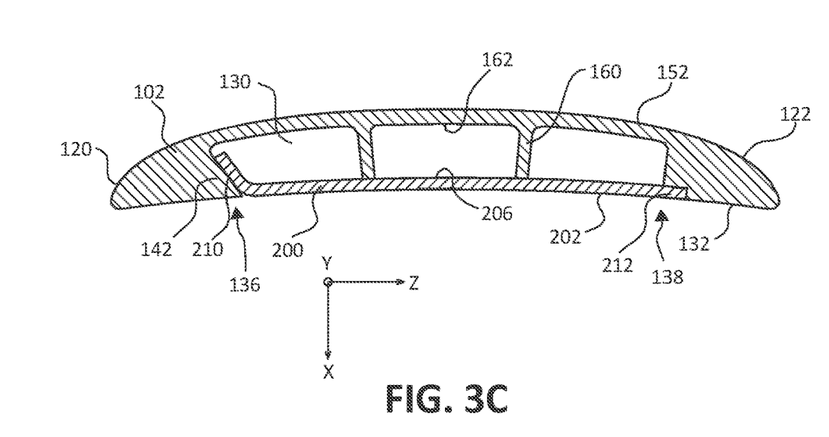
FIG. 3C illustrates a cross-sectional view taken along line 3C-3C of FIG. 2 of a blade assembly, in accordance with various embodiments.

With reference to FIG. 3C, a blade assembly 150 for a rotor system, such as for a fan section, is shown in accordance with various embodiments. FIG. 3C shows a cross sectional view of first portion 136 and second portion 138 of perimeter 134 of cavity 130 from FIG. 2, the cross section taken along line 3C-3C of FIG. 2. FIG. 3C further shows blade cover 200 in the cross sectional view. Blade 102 may include ribs 160 extending inward from second surface 152 of blade 102 and into cavity 130. Ribs 160 may operate to stiffen or strengthen blade 102. Additionally, ribs 160 may support blade cover 200. An inner surface 206 of blade cover 200 may contact ribs 160 and may be adhered or bonded to ribs 160.

In various embodiments, blade cover 200 may include leading edge 210 and a trailing edge 212. At a proximal end of blade cover 200, leading edge 210 of blade cover 200 may configured to fit under lip 142 of blade 102 wherein "under" in this context only means between lip 142 and blade body 110 of blade 102, between lip 142 and cavity 130, and/or between first surface 132 and second surface 152 of blade 102. Leading edge 210 of blade cover 200 may be angled inward with respect to blade cover 200 and/or blade assembly 150. Trailing edge 212 of blade cover 200 may fit over supporting surface 140 of blade 102. Thus, outer surface 202 of blade cover 200 may contact an inner surface 162 of blade 102 at lip 142, and an inner surface 206 of blade cover 200 may contact an outer surface, such as first surface 132, of blade 102 at supporting surface 140. Trailing edge 212 of blade cover 200 may extend over supporting surface 140. Trailing edge 212 may be configured to rest on supporting surface 140 such that supporting surface 140 may contact inner surface 206 of blade cover 200. An absence of lip 142 at trailing edge 122 allows for installation of blade cover 200. For example, blade cover 200 may be installed by sliding leading edge 210 under lip 142 prior to positioning trailing edge 212 of blade cover 200 onto supporting surface 140.

In various embodiments, blade cover 200 may be further secured to one or more portions of blade 102, such as to supporting surface 140 and lip 142, using an adhesive (e.g., an adhesive paste, epoxy, glue, and/or adhesive film). An adhesive may further be applied to inner surface 206 of blade cover 200, to ribs 160, to supporting surface 140, and/or inner surface 154 of lip 142 using, for example, a rubber adhesive or epoxy. Cavity 130 may be defined by inner surface 206 of blade cover 200 inner surface and further by an inner surface 162 of blade body 110 of blade 102.

Figure 4:
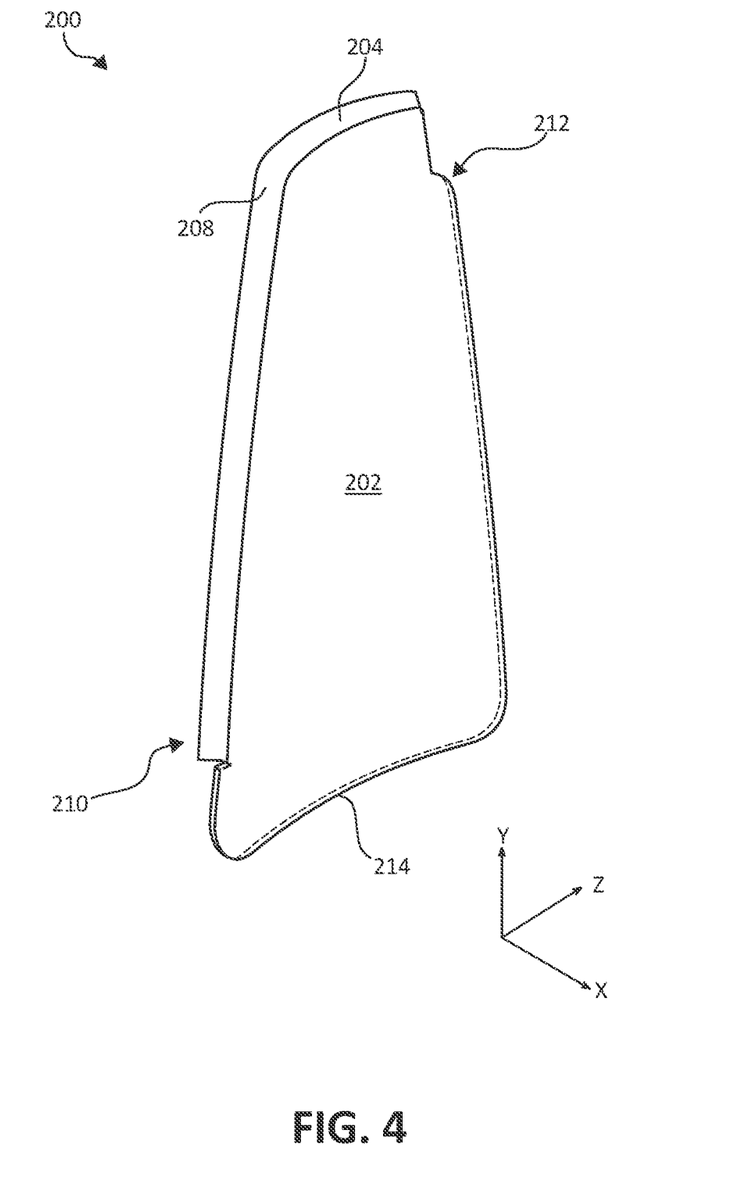
FIG. 4 illustrates a perspective view of a blade cover, in accordance with various embodiments.
Figure 5:
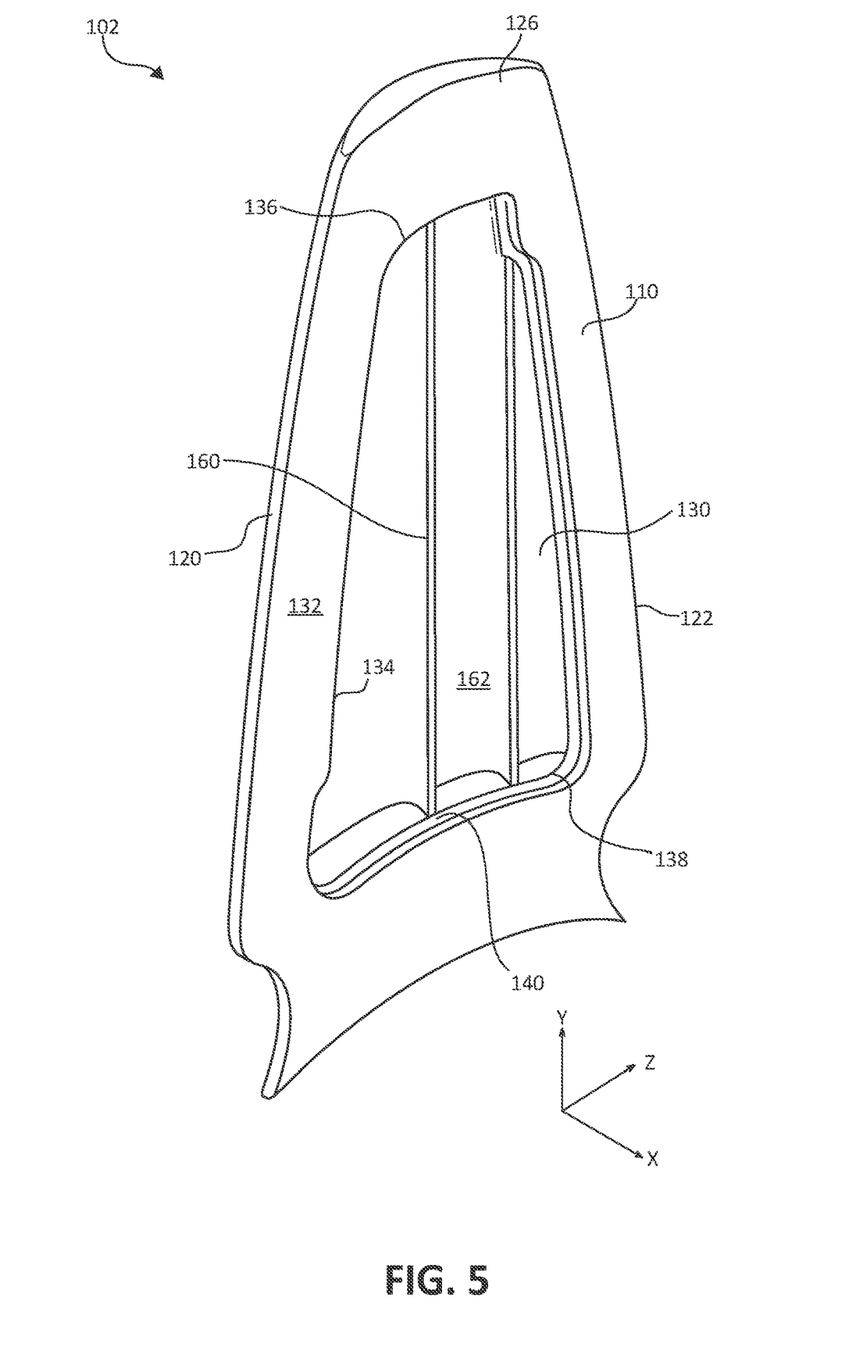
FIG. 5 illustrates a perspective view of a blade, in accordance with various embodiments.

With reference to FIG. 4, a perspective view of a blade cover is shown, in accordance with various embodiments. In various embodiments, blade cover 200 may comprise a geometry that is complementary to the geometry of perimeter 134 of cavity 130 (FIG. 5). The portions of blade cover 200, for example, at leading edge 210 and radially outer edge 204 may have different geometrical features than the portions of blade cover 200, for example, at trailing edge 212 and a radially inner edge 214. Outer edge portion 208 of blade cover 200, such as leading edge 210 and radially outer edge 204, may comprise a retention feature, for example an angled or flared edge, configured to interface with lip 142 of blade 102. Blade cover 200 may comprise a retention feature at any of leading edge 210, radially inner edge 214, radially outer edge 204, and/or trailing edge 212 of blade cover 200. Outer edge portion 208 of blade cover 200, such as trailing edge 212 and radially inner edge 214, may comprise a support feature, such as a generally flat edge, configured to interface with supporting surface 140 of blade 102. Blade cover 200 may comprise a support feature at any of leading edge 210, radially inner edge 214, radially outer edge 204, and/or trailing edge 212 of blade cover 200. Blade cover 200 may interface with blade 102 to mechanically retain blade cover 200 with respect to blade 102.

In various embodiments, as illustrated in FIG. 4, a retention feature of blade cover 200, for example an angled or flared edge, may be disposed along at least a portion of leading edge 210 and radially outer edge 204 of blade cover 200, and may further be disposed along a portion of trailing edge 212 of blade cover 200. As illustrated in FIG. 4, a support feature of blade cover 200, such as a generally flat edge, may be disposed along at least a portion of trailing edge 212, and radially inner edge 214, and may further be disposed along a portion of leading edge 210 of blade cover 200. In various embodiments, a retention feature of blade cover 200, for example an angled or flared edge, may be disposed along at least a portion of radially outer edge 204 and radially inner edge 214 of blade cover 200, while a support feature of blade cover 200, such as a generally flat edge, may be disposed along at least a portion of leading edge 210 and trailing edge 212. The retention feature of blade cover 200 may be disposed along at least a portion of leading edge 210 and trailing edge 212, while the support feature may be disposed along at least a portion of radially outer edge 204 and radially inner edge 214 of blade cover 200. It will be understood that the retention feature of blade cover 200, such as an angled or flared edge, and a support feature of blade cover 200, such as a generally flat edge, may be formed at various locations along the outer edge portion 208 of blade cover 200.

In various embodiments, blade cover 200 may be manufactured using sheet metal forming, composite fabrication, forging, casting, additive manufacturing, machining or the like. The features of cavity 130, such as supporting surface 140, lip 142, and ribs 160, and inner surface 162 geometry, may further be formed by milling, forging, electrochemical machining (ECM), or electrostatic discharge machining (EDM) as desired, for example. Blade cover 200 may be fabricated from titanium, a titanium alloy, aluminum, aluminum alloy, composite material or other suitable structural material(s).

With reference to FIG. 5, a perspective view of a fan blade is shown, in accordance with various embodiments. Blade 102 may generally be made of a concave, pressure side wall, first surface 132 and a convex, suction side wall, a second surface 152, opposite the concave, pressure side wall. Blade 102 may generally include and a tip 126 extending between and coupling first surface 132 and second surface 152. Cavity 130 may be formed through first surface 132 of blade body 110 and may be configured to receive a blade cover 200 such that blade cover 200 forms a continuous aerodynamic surface with first surface 132 of blade 102.

In various embodiments, blade 102 may be manufactured using sheet metal forming, composite fabrication, forging, casting, additive manufacturing, machining or the like. The features of blade 102, such as cavity 130 with perimeter 134 including lip 142, supporting surface 140 and ribs 160 may further be formed by milling, ECM, or EDM as desired, for example. Blade 102 may be fabricated from titanium, a titanium alloy, aluminum, aluminum alloy, composite material or other suitable structural material(s). It will be noted that blade for gas turbine engines may be provided in the variety of sizes, shapes and styles. The blades designated by element number 102 in FIGS. 2, 3A-3C and 5 are but mere examples and this disclosure is not limited to the specific blades disclosed herein. Further, the disclosed fan blade designs may be adapted for use in other types of jet engines, propellers, rotors, etc.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A blade assembly configured to rotate about an axis of a gas turbine engine, comprising:
   a blade including a first surface defining a perimeter of a cavity in the blade, wherein a first portion of the perimeter of the cavity includes a lip and is disposed along a first leading edge portion, a first chord portion, and a first trailing edge portion, and wherein a second portion of the perimeter of the cavity includes a support surface and is disposed along a second leading edge portion, a second chord portion and a second trailing edge portion, wherein the lip ends at a transition from the first portion of the perimeter of the cavity to the second portion of the perimeter the cavity, and a blade cover disposed over the cavity in the blade, such that the cavity is disposed between the blade and the blade cover, and under the, such that the blade cover is between a first portion of the blade and the cavity.

2. The blade assembly of claim 1, wherein the blade cover is disposed over the supporting surface such that a second portion of the blade is disposed between the blade cover and the cavity.

3. The blade assembly of claim 1, wherein an outer surface of the blade cover contacts an inner surface of the blade, and an inner surface of the blade cover at least one of directly or indirectly contacts an outer surface of the blade.

4. The blade assembly of claim 3, wherein the inner surface of the blade cover contacts the outer surface of the blade through an adhesive disposed between the blade cover and the blade.

5. A fan section of a gas turbine engine, comprising: a blade assembly configured to rotate about an axis, the blade assembly, comprising:
   a blade including a first surface defining a perimeter of a cavity in the blade, wherein a first portion of the perimeter of the cavity includes a lip and is disposed along a first leading edge portion, a first chord portion, and a first trailing edge portion, and wherein a second portion of the perimeter of the cavity includes a support surface and is disposed along a second leading edge portion, a second chord portion and a second trailing edge portion, and
   a blade cover disposed over the cavity in the blade, such that the cavity is disposed between the blade and the blade cover, and under the lip, such that the blade cover is between a first portion of the blade and the cavity, wherein the lip ends at a transition from the first portion of the perimeter of the cavity to the second portion of the perimeter the cavity.

6. The fan section of claim 5, wherein the blade cover is disposed over the supporting surface such that a second portion of the blade is disposed between the blade cover and the cavity.

7. The fan section of claim 5, wherein the first chord portion comprises a tip of the blade, and the second chord portion comprises a radially inner edge.

8. The fan section of claim 5, wherein an outer surface of the blade cover contacts an inner surface of the blade, and an inner surface of the blade cover at least one of indirectly or directly contacts an outer surface of the blade.

9. A gas turbine engine, comprising:
   a fan section including:
      a disk; and
      a blade assembly coupled to the disk, the disk configured to rotate about an axis, the blade assembly comprising:
         a blade including a first surface defining a perimeter of a cavity in the blade, wherein a first portion of the perimeter of the cavity includes a lip and is disposed along a first leading edge portion, a first chord portion, and a first trailing edge portion, wherein a second portion of the perimeter of the cavity includes a support surface and is disposed along a second leading edge portion, a second chord portion and a second trailing edge portion, and wherein the lip ends at a transition from the first portion of the perimeter of the cavity to the second portion of the perimeter the cavity, and
         a blade cover disposed over the cavity in the blade, such that the cavity is disposed between the blade and the blade cover, and under the lip, such that the blade cover is between a first portion of the blade and the cavity.

10. The gas turbine engine of claim 9, wherein the first chord portion comprises a tip and the second chord comprises a radially inner edge.

11. The gas turbine engine of claim 9, wherein an outer surface of the blade cover contacts an inner surface of the blade, and an inner surface of the blade cover contacts an outer surface of the blade.

* * * * *